March 13, 1928.
N. KING
1,662,192
BACK TURNING ATTACHMENT FOR LATHES
Filed June 30, 1924
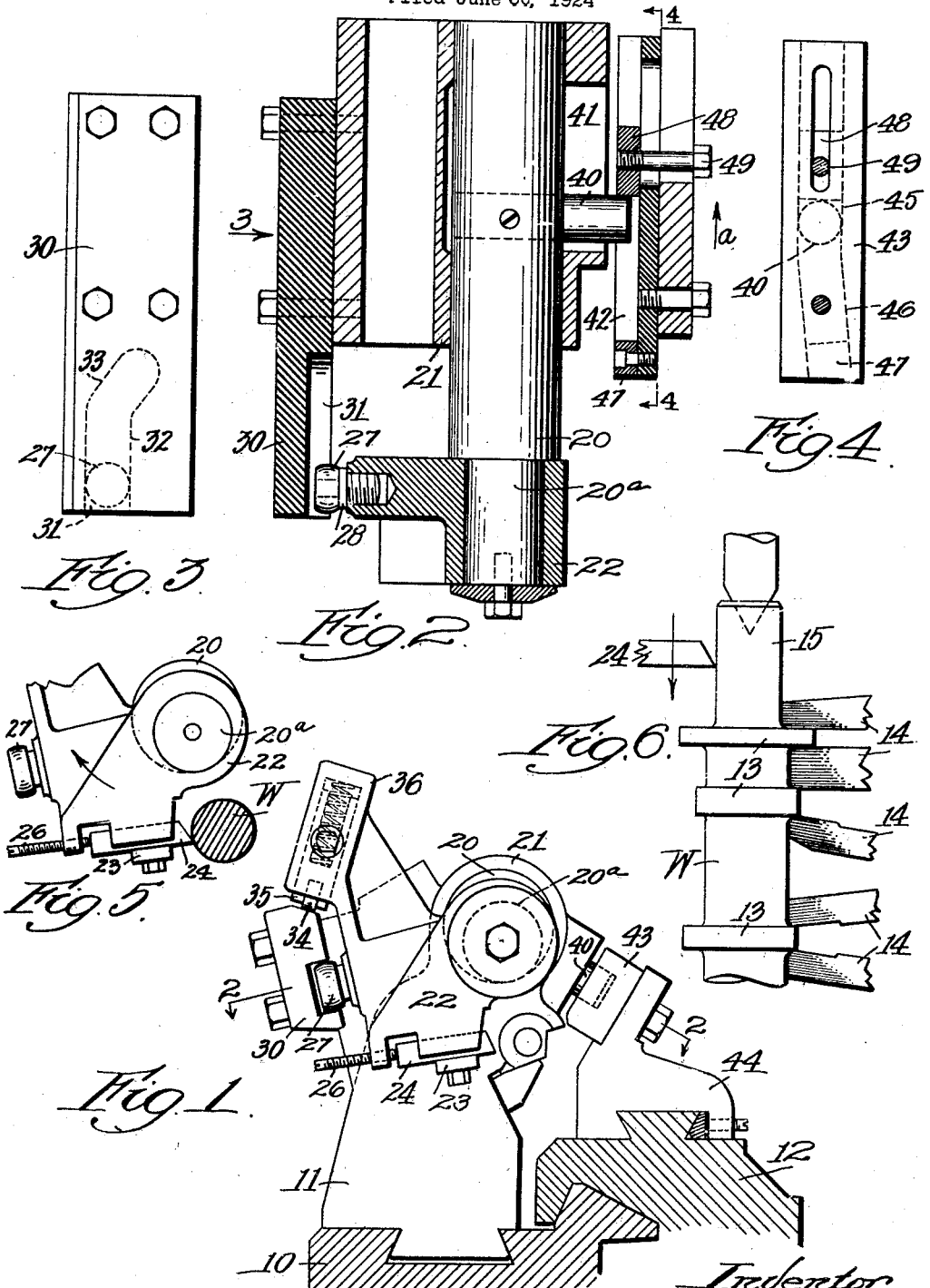

Patented Mar. 13, 1928.

1,662,192

UNITED STATES PATENT OFFICE.

NATHANIEL KING, OF FITCHBURG, MASSACHUSETTS, ASSIGNOR TO SENECA FALLS MACHINE COMPANY, OF FITCHBURG, MASSACHUSETTS, A CORPORATION OF MASSACHUSETTS.

BACK-TURNING ATTACHMENT FOR LATHES.

Application filed June 30, 1924. Serial No. 723,110.

This invention relates to lathes and particularly to a special turning attachment for use thereon. In the manufacture of cam shafts and other similar work, it is frequently necessary to finish an end bearing on the shaft in addition to squaring up numerous shoulders and flanges thereon.

It is the general object of my invention to provide a back turning attachment which will operate at the back side of the work simultaneously with the operation of the squaring tools at the front side of the work and which will finish an end bearing without the necessity of an extra operation.

A more specific object of my invention relates to the provision of a back turning attachment mounted upon the tail stock of a lathe and actuated from the usual tool carriage.

My invention further contemplates the provision of a special relieving or retracting device by which the tool may be caused to clear the work before the commencement of its idle or return movement, and to the further provision of means for adjusting the cutting stroke of the tool to any desired fraction of the carriage travel.

My invention further relates to arrangements and combinations of parts which will be hereinafter described and more particularly pointed out in the appended claims.

A preferred form of the invention is shown in the drawings, in which

Fig. 1 is a sectional transverse elevation of the rear portion of a lathe embodying my improvements;

Fig. 2 is a sectional plan view taken along the irregular line 2—2 in Fig. 1;

Fig. 3 is a detail rear elevation of a cam plate, looking in the direction of the arrow 3 in Fig. 2;

Fig. 4 is a detail sectional front elevation, taken along the line 4—4 in Fig. 2;

Fig. 5 is an end elevation of the tool holder; and

Fig. 6 is a diagrammatic view indicating the nature of the operations to be performed by my invention.

Referring to the drawings, I have indicated certain portions of an engine lathe including a frame or bed 10, a tail stock 11 mounted for longitudinal adjustment thereon in the usual manner and a tool carriage 12 provided with the usual longitudinal feeding mechanism, not shown. A sample of the work for which my attachment is particularly adapted is indicated in Fig. 6, which shows a portion of a cam shaft W having cams or flanges 13 thereon adapted to be engaged and finished by a plurality of cutting or squaring tools 14.

The mechanism for advancing the tools 14 toward the work is not shown herein and forms no part of my present invention, it being sufficient to state that the tools are advanced toward the work by longitudinal movement of the usual tool carriage 12, although the tools 14 are not supported thereby. At the end of the cam shaft W, an end bearing 15 is shown and it is for finishing this end bearing that my attachment is provided.

My improved back turning attachment comprises a cylindrical support 20 mounted to slide in a bearing 21 formed as an upward extension of the tail stock. The support 20 is also free to move angularly to a limited extent for a purpose to be described. At the end of the support 20 an eccentric bearing 20ª is provided for a tool holder 22.

A clamping block 23 (Fig. 5) is provided for securing an inverted tool 24 in the holder and a setting screw 26 may be used to adjust the tool toward the work W.

A cam roll 27 is mounted on a stud 28 (Fig. 2) fixed in the tool holder 22. A cam plate 30 is bolted to the rear side of the tail stock 11 and is provided with a cam slot 31 having a straight portion 32 (Fig. 3) and an inclined portion 33. The cam roll 27 co-operates with the cam slot 31 to swing the tool holder 22 on its bearing 20ª, as the support 20 is moved axially of the work.

A roll 34 (Fig. 1) is mounted on a spring plunger 35 which is slidable in an upward extension 36 of the tool holder 22. The roll 34 engages a contacting surface on the upper face of the cam plate 30, causing the cam roll 27 to closely and continuously engage the upper surface of the cam slot 31 and thus preventing any back lash or chatter of the tool.

During the forward or working stroke, the roll 27 follows the straight part 32 of the cam slot 31 but when withdrawn beyond the end of the work, the roll 27 enters the inclined portion 33 of the slot and substantially retracts the tool to facilitate removal and replacement of the work.

A stud 40 (Fig. 2) is fixed transversely in the cylindrical support 20 and extends through a wide slot or opening 41 in the side of the bearing 21. The outer end of the stud 40 is received in a cam slot 42 in a cam plate 43 which is fixed to a bracket 44 (Fig. 1) supported by and secured to the tool carriage 12. The cam slot 42 has a straight portion 45 and a slightly inclined portion 46. A block 47 forms a stop at the outer end of the inclined cam portion 46 and a block 48 is slidable in the straight portion 45 and may be clamped in any adjusted position by a binding screw 49.

Having described the details of construction of my improved back turning attachment, the operation thereof is as follows:—

The parts as shown in Fig. 2 are in the position assumed at the end of the turning operation, with the tool 24 advanced adjacent the end flange 13 of the work W. The tool carriage then commences its movement to the rear or in the direction of the arrow $a$ in Fig. 2. During the first part of this rearward movement, the cam plate 43 slides idly past the stud 40 on the cylindrical support 20, without producing rearward longitudinal movement of the support. During such movement, however, the stud 40 is moved angularly by the inclined portion 46 of the cam slot 42 and this angular movement acting through the eccentric bearing 21 swings the tool holder 22 in a direction to slightly withdraw or retract the tool 24 from the work before any axial movement of the tool on its return stroke occurs.

The stud 40 is thereafter engaged by the end block or stop 47, which moves the support 20 rearwardly and withdraws the tool from the end of the work. During this rearward movement, the cam roll 27 on the tool holder first follows the straight portion 32 on the slot 31 and thereafter enters the inclined portion 33 as previously described and swings the tool substantially away from the work.

Upon moving the tool carriage 12 in the opposite direction, the cam plate 43 again slides idly past the stud 40, bringing the eccentric bearing $20^a$ to operative position before the stud 40 is engaged and moved by the adjustable block 48. The support 20 and tool holder 22 are then advanced longitudinally and the roll 27 swings the tool 24 to operative position before the tool engages the end of the work. The tool then makes its working stroke during the remaining travel of the tool carriage, after which it is retracted and withdrawn as previously described.

It will thus appear that I have provided a simple and substantial mechanism by which the end bearing may be accurately finished simultaneously with the operation of the turning tools 14. By changing the lay-out of the portion 32 of the cam slot 31, the end of the shaft may be given a tapered instead of a cylindrical form.

Having thus described my invention and the advantages thereof I do not wish to be limited to the details herein disclosed otherwise than as set forth in the claims, but what I claim is:—

1. In a lathe, a tail stock, a tool carriage, an auxiliary tool, a tool support therefor mounted on said tail stock and movable longitudinally of the lathe and tail stock, and direct draw-bar connections from said tool carriage to said tool support for movement of said tool thereby axially of the lathe, said tool being advanced at the same speed and in the same direction as said tool carriage through said direct connection thereto.

2. The combination in a lathe as set forth in claim 1, in which said draw-bar connection includes provision for lost motion between the tool carriage and the tool support.

3. The combination in a lathe as set forth in claim 1, in which said draw-bar connection includes provision for lost motion between the tool carriage and the tool support and provision for adjusting the amount of lost motion.

4. In a lathe, a tail stock, a tool movably mounted on said tail stock and adjustable longitudinally of the lathe and tail stock, means to reciprocate said tool on said tail stock, and means to automatically retract said tool radially of the work before the return movement of said tool begins.

5. In a lathe, a tail stock, a tool movably mounted on said tail stock and adjustable longitudinally of the lathe and tail stock, means to reciprocate said tool on said tail stock, means to slightly retract said tool radially of the work before the return movement of the tool begins, and means to substantially retract the tool as it approaches the end of its return movement.

6. In a lathe, a tail stock, a cylindrical support mounted for axial and angular movement therein, a tool, a tool holder eccentrically mounted on said support, means to move said support axially, and means to turn said support to move said tool angularly toward and from the work.

7. In a lathe, a tail stock, a cylindrical support mounted for axial and angular movement therein, a tool eccentrically mounted on said support, a tool carriage, a cam plate movable with said carriage, and a cam follower on said support, said plate and follower co-operating to move said tool axially along the work and to swing said support angularly to move said tool toward and from the work.

8. In a lathe, a tail stock, a cylindrical support mounted for axial and angular movement therein, a tool, a tool holder eccentrically mounted on said support, means to move said support axially, and a fixed cam plate co-operating with said tool holder to swing said tool substantially away from the work as said support approaches extreme rearward position.

9. In a lathe, a tail stock, a cylindrical support mounted for axial and angular movement therein, a tool, a tool holder eccentrically mounted on said support, means to move said support axially, a cam plate fixed to said tail stock, a cam roll on said tool holder co-operating with said cam plate to swing said tool toward and from the work, and a presser roll yieldingly mounted on said tool holder and engaging said cam plate to cause said plate and roll to be firmly and continuously engaged.

10. In a lathe, a tail stock, a cylindrical support mounted for axial and angular movement therein, a tool mounted on said support, a tool carriage, a cam plate movable with said carriage axially of the lathe, a cam follower on said support, and an abutment on said cam plate adjustable axially of the lathe on said plate and positioned to engage said cam follower and positively advance said support.

11. In a lathe, a tail stock, a cylindrical support mounted for axial and angular movement therein, a tool mounted on said support, a tool carriage, a cam plate movable with said carriage axially of the lathe, a cam follower on said support, an abutment on said cam plate adjustable axially of the lathe on said plate and positioned to engage said cam follower and positively advance said support, and a second abutment positioned to engage said cam follower and positively withdraw said support.

In testimony whereof I have hereunto affixed my signature.

NATHANIEL KING.